H. J. DOUGHTY.
PROCESS OF FORMING A TIRE CASING.
APPLICATION FILED JAN. 3, 1913.

1,077,127.

Patented Oct. 28, 1913.

2 SHEETS—SHEET 1.

Witnesses
W. W. Bardsley
E. J. Ogden

Inventor.
Henry J. Doughty.

By Howard E. Barlow
Attorney.

H. J. DOUGHTY.
PROCESS OF FORMING A TIRE CASING.
APPLICATION FILED JAN. 3, 1913.
1,077,127.
Patented Oct. 28, 1913.
2 SHEETS—SHEET 2.
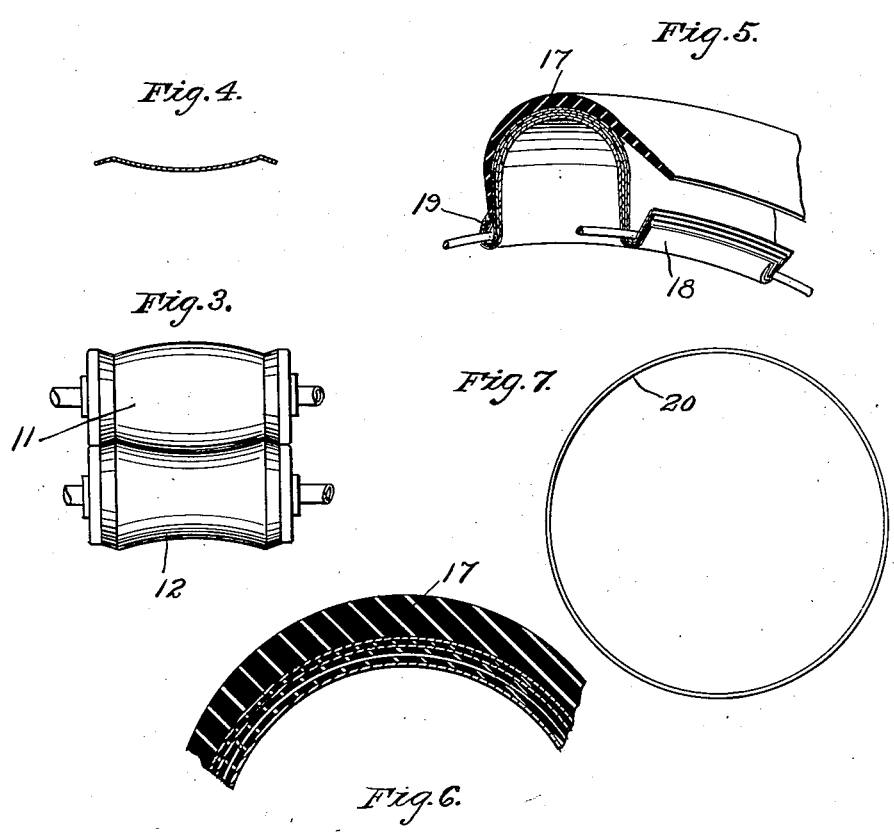
Witnesses
W. W. Bardsley
E. D. Ogden
Inventor
Henry J. Doughty
By
Howard E. Barlow
Attorney.

UNITED STATES PATENT OFFICE.

HENRY J. DOUGHTY, OF EDGEWOOD, RHODE ISLAND.

PROCESS OF FORMING A TIRE-CASING.

1,077,127. Specification of Letters Patent. Patented Oct. 28, 1913.

Application filed January 3, 1913. Serial No. 739,986.

*To all whom it may concern:*

Be it known that I, HENRY J. DOUGHTY, a citizen of the United States, and resident of Edgewood, in the county of Providence and State of Rhode Island, have invented certain new and useful Improvements in Process of Forming a Tire-Casing, of which the following is a specification.

This invention relates to the process of forming a tire casing, which consists of weaving a fabric strip of the required width into an irregular shape in cross section, or in form to naturally take the shape of the finished casing, both in transverse section and circularly around its circumference, the tread portion of the fabric being more porous or having a more open weave than that at the sides, then passing this fabric through a set of friction rolls to apply a coating of rubber thereto under pressure, heating the rolls to soften the coating material, stretching the coated fabric transversely and winding it spirally in a plurality of superimposed layers while still warm into a former to cause it to take its finished shape, applying a layer of rubber to its tread portion and a wire ring or other stiffening to its bead portions and then molding and vulcanizing this built up casing under pressure into its finished form.

With these and other objects in view, the invention consists of certain novel features of construction, as will be more fully described and particularly pointed out in the appended claims.

Figure 1:
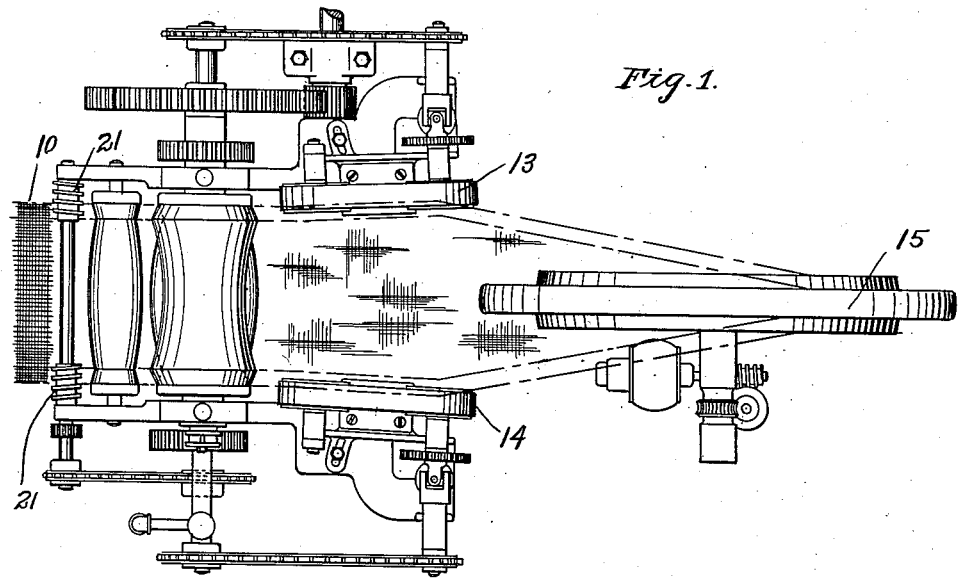
Figure 2:
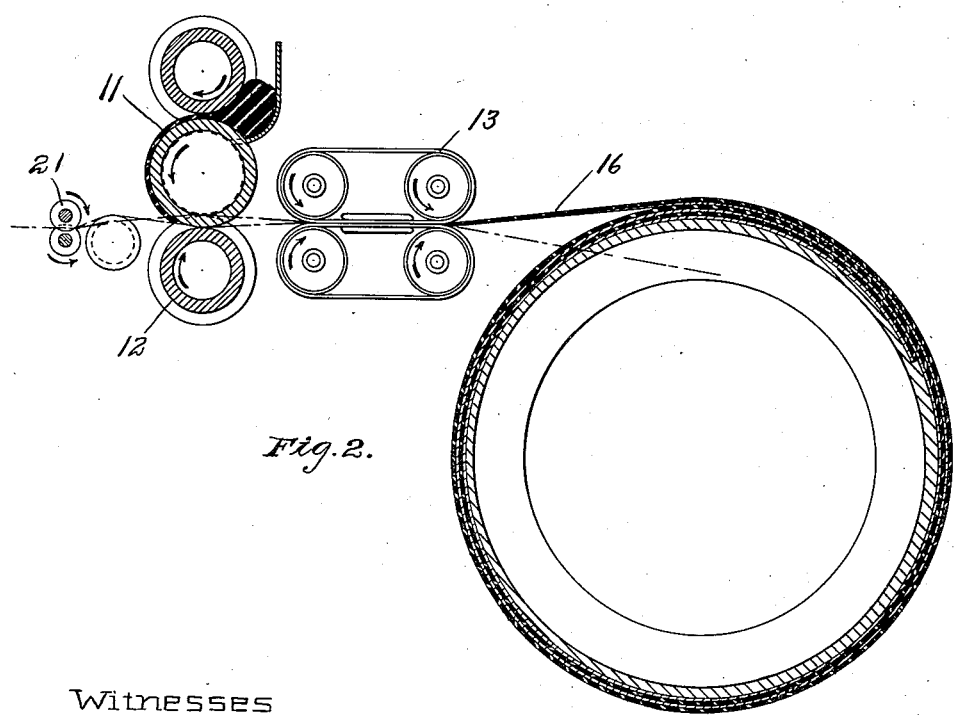

Of the accompanying drawings: Figure 1— is a plan view illustrating the machine for applying the coating material to the fabric, stretching the fabric transversely and winding it on a former. Fig. 2— is a sectional elevation of the machine and showing the fabric wound spirally on the former. Fig. 3— is a front view showing a pair of the calender rolls shaped to hold the fabric in its natural form while being coated. Fig. 4— is a transverse sectional view of the fabric substantially in the form produced by the loom. Fig. 5— illustrates a sectional view of the casing showing the separate rubber outer facing which is applied thereto and the manner of applying the wires or stiffening members to the bead portions. Fig. 6— is an enlarged transverse sectional view of a portion of the tire illustrating the different layers of rubber covered fabric and the rubber outer facing on the casing. Fig. 7— illustrates one of the continuous wire rings which is inserted as a stiffener into the head portion of the tire.

The fabric employed in the formation of my improved process of building a tire, is woven on a loom in a continuous strip of the necessary width for the tire, the middle or tread portion of the fabric being preferably of a more open weave than that at the sides and composed of threads larger than those at the sides. An essential feature in the construction of this fabric is that it is woven in an irregular shape in cross section, that is, its shape in cross section is not plain like ordinary fabric, but is preferably substantially concavo-convex, as illustrated in Fig. 4, which shape is necessary, so that the fabric when applied to the forming wheel in building or constructing the tire will naturally take the full shape or contour of the casing, both of a substantial U-shape in transverse section and circularly around the circumference of the casing. A coating of rubber, or other suitable plastic material, is applied to this fabric under pressure by means of a friction calendering machine, as illustrated in Fig. 1, and in order to apply a coating uniformly to the fabric I preferably employ a set of cylinders in the calender preferably of the form illustrated in Fig. 3, which will cause the fabric to take its natural woven shape while the coating material is being applied thereto, and this calendering machine is so constructed as to apply a heavy pressure to the fabric while being surfaced to force the material into and through the pores of the fabric and then press and iron it. While this plastic material is being applied to the fabric both are preferably heated to the desired temperature by admitting steam to the hollow rolls, first before entering these rolls the fabric is by the worms 21 stretched out transversely to prevent it from wrinkling, and immediately upon emerging from the rolls the edges of the fabric are engaged by the traveling belts 13 and 14, respectively, and draw with considerable force transversely to stretch the weft threads to such an extent that when the tire is finished it will hold its shape transversely and not bulge out on the sides when inflated as is the case where the weft threads are not submitted to a stretching action while the casing is yet heated and the rubber in a plastic condition during the process of construction. Another feature of my improved process is that this continuous strip of fabric after having been stretched laterally and while yet warm from the calender rolls is led directly onto a rotating form or mold wheel 15 where the fabric is caused to take its natural shape both transversely and circularly and is wound spirally or one layer upon another until a sufficient number of layers have been deposited, after which the strip is severed at the point 16 and the mold wheel with its layer of laid up fabric removed and another wheel immediately set to take its place to continuously receive the fabric from the calender without stopping the action of the same. A covering or thick layer of rubber 17, see Fig. 5, is now placed around the outer layer of fabric and a continuous wire ring or hoop 20, or other stiffening or stengthening member is inserted into the bead portions of the tire and the flaps 18 and 19 turned back against the sides of the casing, after which the casing thus built up is removed from the former and placed in the molding and vulcanizing machine, where it undergones the action of a tremendous pressure in a mold ring and heat is applied thereto sufficient to vulcanize the whole. After this vulcanizing and molding process has been completed the mold is opened and the finished tire casing withdrawn ready for use.

I claim:

1. That process of forming tire casings which comprises impregnating a concavo-convex fabric strip with plastic material and winding the impregnated strip spirally, while heated, upon a form corresponding in shape to the said strip.

2. That process of forming a tire casing which consists in heating and impregnating with rubber a strip initially fabricated to conform to the shape of the tire and winding said strip while still heated upon a form corresponding to the shape of the tire.

In testimony whereof I affix my signature in presence of two witnesses.

HENRY J. DOUGHTY.

Witnesses:
    HOWARD E. BARLOW,
    E. I. OGDEN.